(No Model.)
J. STAIGER & G. H. SCOFIELD.
DRAFT EQUALIZER.
No. 349,372. Patented Sept. 21, 1886.
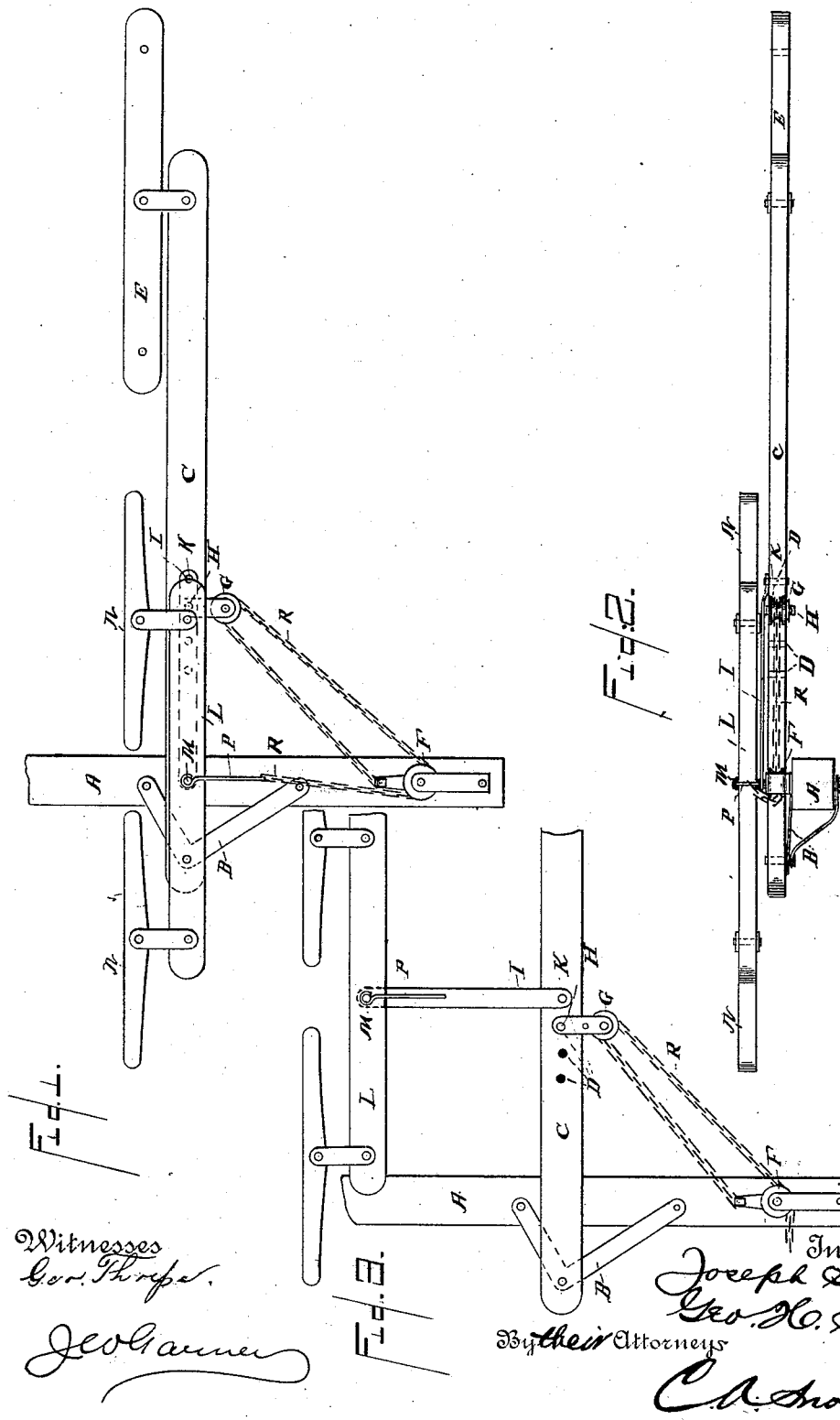

UNITED STATES PATENT OFFICE.

JOSEPH STAIGER AND GEORGE HENRY SCOFIELD, OF ZUMBROTA, MINN.

DRAFT-EQUALIZER.

SPECIFICATION forming part of Letters Patent No. 349,372, dated September 21, 1886.

Application filed July 12, 1886. Serial No. 207,811. (No model.)

*To all whom it may concern:*

Be it known that we, JOSEPH STAIGER and GEORGE HENRY SCOFIELD, citizens of the United States, residing at Zumbrota, in the county of Goodhue and State of Minnesota, have invented a new and useful Improvement in Draft-Equalizers, of which the following is a specification.

Our invention relates to an improvement in draft-equalizers; and it consists in the peculiar construction and combination of devices that will be more fully set forth hereinafter, and particularly pointed out in the claims.

In the drawings, Figure 1 is a top plan view of a draft-equalizer embodying our improvements. Fig. 2 is a rear elevation of the same. Fig. 3 is a plan view similar to Fig. 1, with the double-tree swung forward and the chain disconnected.

Our invention is particularly adapted to be used on harvesting-machines and other agricultural machines in which there is a heavy side draft.

A represents the pole or tongue, and B represents a bracket which is attached thereto and projects from one side of the tongue near the rear end of the latter. To this bracket is pivoted one end of an equalizing-bar, C, which projects from the side of the tongue opposite that on which the bracket B is located. This equalizing-bar is provided near its inner end with a series of openings, D. To the outer end of the equalizing-bar is attached a double-tree, E.

F represents a pulley, which is secured on the upper side of the tongue near the rear end thereof, and G represents a pulley which is secured on the rear side of the equalizing-bar by means of a pin or bolt, H, which passes through the front end of the pulley-block, and also through one of the openings D.

I represents a lever-bar, which has one end pivoted in one of the openings D by means of the bolt K. The opposite extremity of the said lever-bar is pivoted to the center of a double-tree, L, by means of a bolt, M. Single-trees N are attached to the ends of the double-tree L, one of the said single-trees being on each side of the tongue, and single-trees O are also attached to the ends of the double-tree E, thereby providing means for the attachment of four horses. A clevis, P, is attached to the projecting ends of the bolt M, and extends rearwardly from the double-tree L, and to the said clevis is attached a chain, R, which passes rearwardly around the pulley F, and from thence outwardly and forwardly and around the pulley G, and the free end of the said chain is attached to the tongue in advance of the pulley G, or to the bed of the harvester, as preferred.

The equalizing-bar projects from the side of the tongue on which the heaviest side strain is exerted.

The operation of our invention will be very readily understood from the foregoing description and the accompanying drawings.

Having thus described our invention, we claim—

1. The combination of the tongue, the equalizing-bar having one end pivoted on one side of the tongue, the outer end of the said bar projecting beyond the opposite side of the tongue, the pulley F, attached to the tongue, the pulley G, attached to the equalizing-bar, the lever-bar I, having one end pivoted to the equalizing-bar, the double-tree L, pivoted to the opposite end of the lever-bar I, the double-tree E, attached to the outer end of the equalizing-bar, the chain attached to the double-tree L and passed around the pulleys F and G, the free end of the said chain being attached to the tongue or to the bed of the machine or vehicle, substantially as described.

2. The combination of the tongue having the bracket or plate B on one side, and the pulley F, with the equalizing-bar C, having the series of openings D, one end of the said bar being pivoted on the brackets B, the pulley G, attached to one of the openings D of the equalizing-bar, the lever-bar I, having one end also attached to one of the said openings, whereby the said lever-bar and pulley G may be laterally moved on the equalizing-bar, the double tree L, attached to the free end of the bar I, the double-tree attached to the outer end of the equalizing-bar, and the chain attached to the double-tree L, passed around the pulleys F and G, and having its free end
5 attached to the tongue or to the bed of the machine or vehicle, for the purpose set forth, substantially as described.

In testimony that we claim the foregoing as our own we have hereto affixed our signatures in presence of two witnesses.

JOSEPH STAIGER.
GEORGE HENRY SCOFIELD.

Witnesses:
C. B. McKINSELY,
WILLIAM MUTCHAN.